(12) United States Patent
Yu et al.

(10) Patent No.: US 10,571,650 B2
(45) Date of Patent: Feb. 25, 2020

(54) LENS DRIVING MODULE HAVING SUSPENSION WIRE

(71) Applicant: TDK TAIWAN CORP., Yangmei Taoyuan (TW)

(72) Inventors: Cheng-Kai Yu, Yangmei Taoyuan (TW); Yi-Ho Chen, Yangmei Taoyuan (TW); Chao-Chang Hu, Yangmei Taoyuan (TW); Sin-Jhong Song, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 129 days.

(21) Appl. No.: 15/787,068

(22) Filed: Oct. 18, 2017

(65) Prior Publication Data

US 2018/0106980 A1 Apr. 19, 2018

Related U.S. Application Data

(60) Provisional application No. 62/409,469, filed on Oct. 18, 2016, provisional application No. 62/538,269, filed on Jul. 28, 2017.

(30) Foreign Application Priority Data

Oct. 10, 2017 (CN) .......................... 2017 1 0936613

(51) Int. Cl.
*G02B 27/64* (2006.01)
*G02B 7/10* (2006.01)

(52) U.S. Cl.
CPC ............. *G02B 7/10* (2013.01); *G02B 27/646* (2013.01)

(58) Field of Classification Search
CPC .. G02B 27/64; G02B 27/646; H04N 5/23248; H04N 5/23264; H04N 5/2328; H04N 5/23287
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | | |
|---|---|---|---|---|
| 9,377,632 B2 * | 6/2016 | Hu | ........................ | G02B 27/646 |
| 10,133,023 B2 * | 11/2018 | Bai | ........................ | G02B 7/04 |
| 10,209,479 B2 * | 2/2019 | Matsuhisa | ................ | G03B 5/00 |
| 2018/0348539 A1 * | 12/2018 | Kim | ........................ | G03B 5/00 |

* cited by examiner

*Primary Examiner* — Arnel C Lavarias
(74) *Attorney, Agent, or Firm* — Muncy, Geissler, Olds & Lowe, P.C.

(57) ABSTRACT

An optical member driving module is provided, including a moving mechanism, a base, a suspension wire, and an electromagnetic driving mechanism for driving the moving mechanism to move relative to the base. The moving mechanism includes an optical member holder, and the base has a first surface, a second surface, and an opening. The second surface faces the optical member holder and is opposite to the first surface. The opening extends from the first surface to the second surface. The suspension wire extends through the opening, and the opposite ends of the suspension wire are respectively affixed to the first surface and the moving mechanism.

12 Claims, 16 Drawing Sheets

LENS DRIVING MODULE HAVING SUSPENSION WIRE

CROSS REFERENCE TO RELATED APPLICATIONS

This application claims the benefit of U.S. Provisional Application No. 62/409,469, filed Oct. 18, 2016, U.S. Provisional Application No. 62/538,269, filed Jul. 28, 2017, and Chinese Patent Application No. 201710936613.X, filed Oct. 10, 2017, the entirety of which are incorporated by reference herein.

BACKGROUND OF THE INVENTION

Field of the Invention

The application relates in general to an optical member driving module, and in particular, to an optical member driving module having a suspension wire.

Description of the Related Art

As technology has advanced, a lot of electronic devices (for example, cameras and smartphones) have incorporated the functionality of taking photographs and recording video. These electronic devices have become more commonplace, and have been developed to be more convenient and thin. More and more options are provided for users to choose from.

Generally, an electronic device having the functionality of taking photographs or recording video includes a lens driving module to drive a lens to move along an optical axis, so as to facilitate auto-focus and auto-zoom controls. The light can pass through the lens and form an image on an image sensor.

Furthermore, some electronic devices include a suspension wire to achieve the purpose of image stabilization. However, when the electronic device becomes thinner, its thickness is reduced, and the length of the suspension wire is reduced. The tension of the suspension wire is therefore increased, and the purpose of image stabilization is hard to achieve. Due to restrictions imposed by the manufacturing process, it is hard to reduce the diameter of the suspension wire. Therefore, addressing the aforementioned problem has become an important issue.

BRIEF SUMMARY OF INVENTION

To address the deficiencies of conventional products, an embodiment of the invention provides an optical member driving module, including a moving mechanism, a base, a suspension wire, and an electromagnetic driving mechanism for driving the moving mechanism to move relative to the base. The moving mechanism includes an optical member holder, and the base has a first surface, a second surface, and an opening. The second surface faces the optical member holder and is opposite to the first surface. The opening extends from the first surface to the second surface. The suspension wire extends through the opening, and the opposite ends of the suspension wire are respectively affixed to the first surface and the moving mechanism.

In some embodiments, a gap is formed between the suspension wire and the inner wall of the opening.

In some embodiments, the base has a depression portion, and the distance between the bottom surface of the depression portion and the second surface is less than the distance between the first surface and the second surface.

In some embodiments, the optical member driving module is disposed on an image sensor module, and at least a portion of the image sensor module is accommodated in the depression portion.

In some embodiments, the base has a protrusion protruding from the first surface.

In some embodiments, the protrusion is adjacent to the suspension wire.

In some embodiments, the base has a lateral surface connected to the first surface and the second surface, and an end of the suspension wire is disposed between the lateral surface and the protrusion.

In some embodiments, the base further comprises a first wire, disposed on a first surface.

In some embodiments, the base further comprises an inner wire embedded in the main body and electrically connected to the first wire.

In some embodiments, the first wire and the inner wire are formed on the main body by insert molding.

In some embodiments, the first wire is formed on the main body by coating or using a molded interconnect device.

In some embodiments, the first wire is formed by a metal sheet connected to the main body.

In some embodiments, the optical member driving module further comprises a second wire disposed on the second surface and electrically connected to the electromagnetic driving mechanism.

The invention also provides an optical member driving module, including a moving mechanism, a base, a suspension wire, and an electromagnetic driving mechanism for driving the moving mechanism to move relative to the base. The moving mechanism includes an optical member holder, and the base comprises a main body and a first insulation layer. The main body comprises a plurality of metal frames separated from each other. The thickness of the first insulation layer is less than half of the thickness of the main body.

In some embodiments, the thickness of the first insulation layer is less than ¼ of the thickness of the main body.

In some embodiments, the main body further comprises an extending portion, extended in a direction away from the movable mechanism, wherein the optical member driving module further comprises a suspension wire extended through the opening and connected to the movable mechanism and the base.

In some embodiments, the base further comprises a first blocking member surrounding the extending portion.

In some embodiments, the first blocking member has a hollow structure, and the base further comprises a damping member disposed in the hollow structure.

In some embodiments, the optical member driving module further comprises a position detector, connecting some metal frames of the main body.

In some embodiments, the base further comprises a second blocking member surrounding a connecting portion between the position detector and the main body.

In some embodiments, the base further comprises a third blocking member surrounding the main body.

In some embodiments, the main body further comprises an extending portion, extended toward the movable mechanism, and the movable mechanism is connected to the extending portion.

In some embodiments, the base further comprises a coil assembly, and the main body is disposed between the coil assembly and the first insulation layer.

In some embodiments, the base further comprises a second insulation layer, and the second insulation layer is disposed between the coil assembly and the main body.

In some embodiments, the base further comprises a metal substrate, and the first insulation layer is disposed between the main body and the metal substrate.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1A:
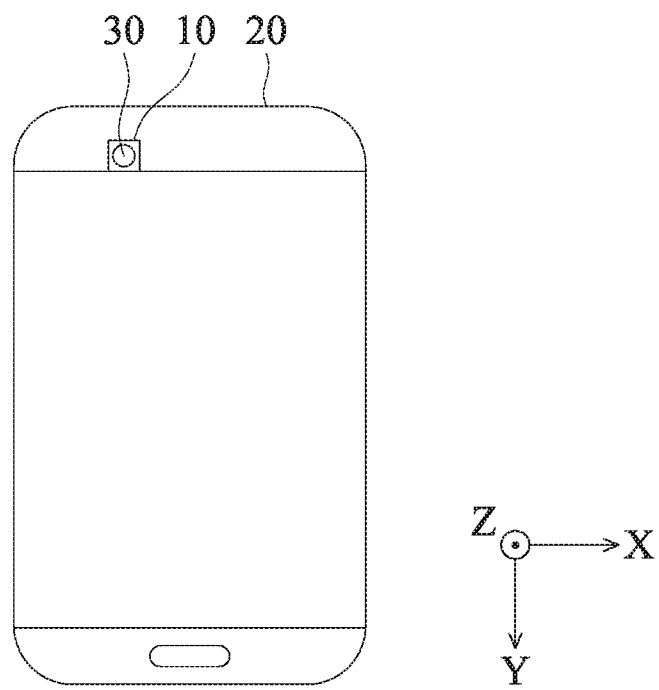
FIG. 1A is a schematic diagram of an electronic device according to an embodiment of the invention.
Figure 1B:
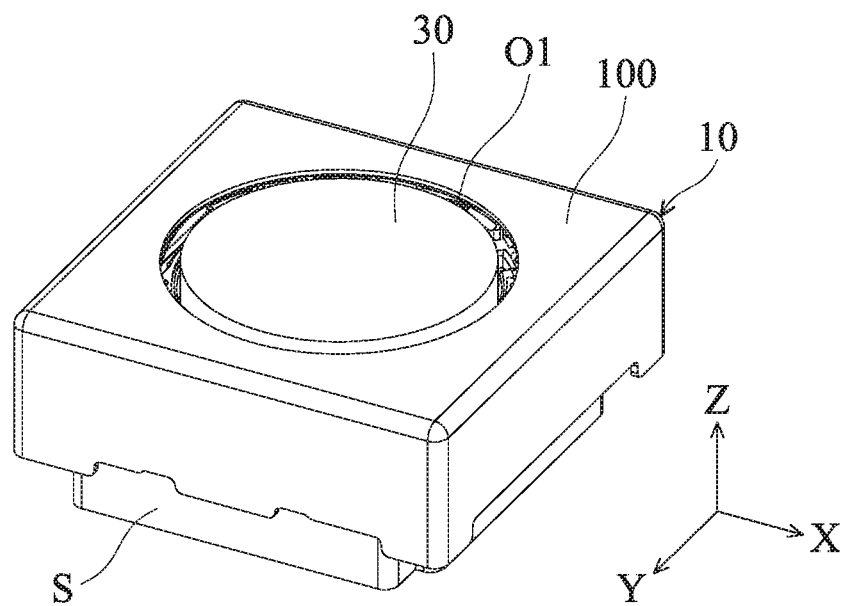
FIG. 1B is a schematic diagram of an optical member driving module, an optical member, and an image sensor according to an embodiment of the invention.

Referring to FIGS. 1A and 1B, in an embodiment of the invention, the optical member driving module 10 can be disposed in an electronic device 20 and used to hold an optical member 30 (such as a lens). The optical member driving module 10 can drive the optical member 30 to move relative to an image sensor module S in the electronic device 20, so as to achieve the purpose of focus adjustment and image stabilization. For example, the electronic device 20 can be a digital camera or a smart phone having the function of capturing photographs or making video recordings. When taking photographs or recording video, the light can pass through the optical member 30, and the image sensor module S can receive the light and form an image.

Figure 2:
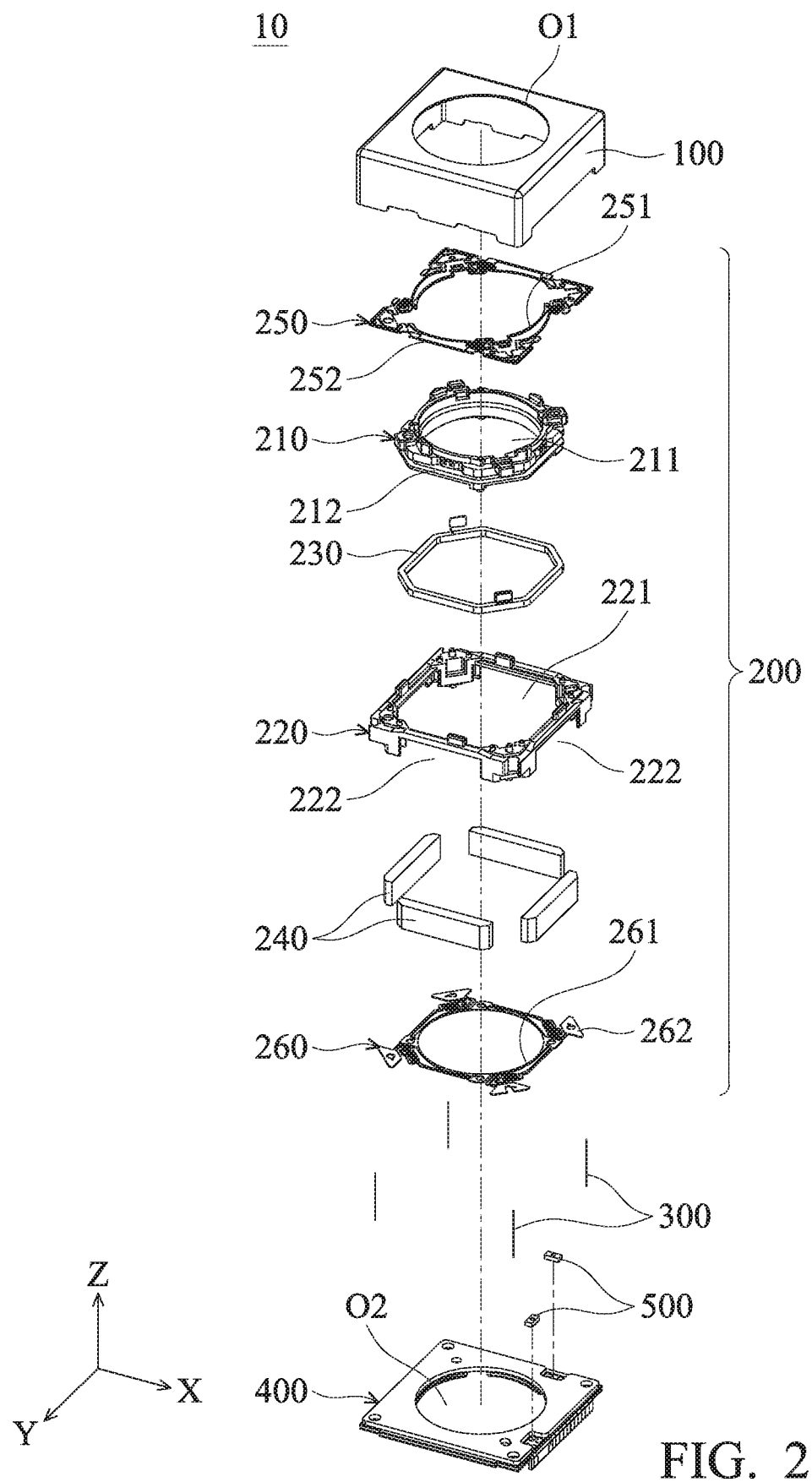
FIG. 2 is an exploded-view diagram of an optical member driving module according to an embodiment of the invention.

As shown in FIG. 2, the optical member driving module 10 primarily comprises a housing 100, a movable mechanism 200, a plurality of suspension wires 300, and a base 400. The housing 100 and the base 400 can be assembled and form a hollow box. The housing 100 surrounds the movable mechanism 200, and the movable mechanism 200 can be accommodated in the hollow box. The housing 100 and the base 400 respectively have an opening O1 and an opening O2 corresponding to each other. The light can reach the image sensor module S through the opening O1, the optical member 30, and the opening O2 in sequence.

The movable mechanism 200 comprises an optical member holder 210, a frame 220, at least one first electromagnetic driving assembly 230, at least one second electromagnetic driving assembly 240, a first elastic member 250, and a second elastic member 260.

The optical member holder 210 has an accommodating space 211 and a concave structure 212, wherein the accommodating space 211 is formed at the center of the optical member holder 210, and the concave structure 212 is formed on the outer wall of the optical member holder 210 and surrounds the accommodating space 211. The optical member 30 can be affixed to the optical member holder 210 and accommodated in the accommodating space 211. The first electromagnetic driving assembly 230 can be disposed in the concave structure 212.

The frame 220 has a receiving portion 221 and a plurality of recesses 222. The optical member holder 210 is received in the receiving portion 221, and the second electromagnetic driving assembly 240 is affixed in the recess 222 and adjacent to the first electromagnetic driving assembly 230.

The optical member holder 210 and the optical member 30 disposed thereon can be driven by electromagnetic effect between the first electromagnetic driving assembly 230 and the second electromagnetic driving assembly 240 to move along the Z-axis relative to the frame 220. For example, in this embodiment, the first electromagnetic driving assembly 230 can be a driving coil surrounding the accommodating space 211 of the optical member holder 210, and the second electromagnetic driving assembly 240 can comprise at least one magnet. When a current flows through the driving coil (the first electromagnetic driving assembly 230), electromagnetic effect is generated between the driving coil and the magnet. Thus, the optical member holder 210 and the optical member 30 disposed thereon can be driven to move along the Z-axis relative to the frame 220. The optical member holder 210 and the optical member 30 can be driven to move along the Z-axis relative to the image sensor module S, and the purpose of focus adjustment can be achieved.

In some embodiments, the first electromagnetic driving assembly 230 can be a magnet, and the second electromagnetic driving assembly 240 can be a driving coil.

As shown in FIG. 2, the first elastic member 250 and the second elastic member 260 are respectively disposed on opposite sides of the optical member holder 210 and the frame 220, and the lens holder 210 and the frame 220 can be disposed therebetween. The inner portion 251 of the first elastic member 250 is connected to the optical member holder 210, and the outer portion 252 of the first elastic member 250 is connected to the frame 220. Similarly, the inner portion 261 of the second elastic member 260 is connected to the optical member holder 210, and the outer portion 262 of the second elastic member 260 is connected to the frame 220. Thus, the optical member holder 210 can be hung in the receiving portion 221 of the frame 220 by the first elastic member 250 and the second elastic member 260, and the range of motion of the optical member holder 210 in the Z-axis can be restricted by the first and second elastic members 250 and 260.

Figure 3:
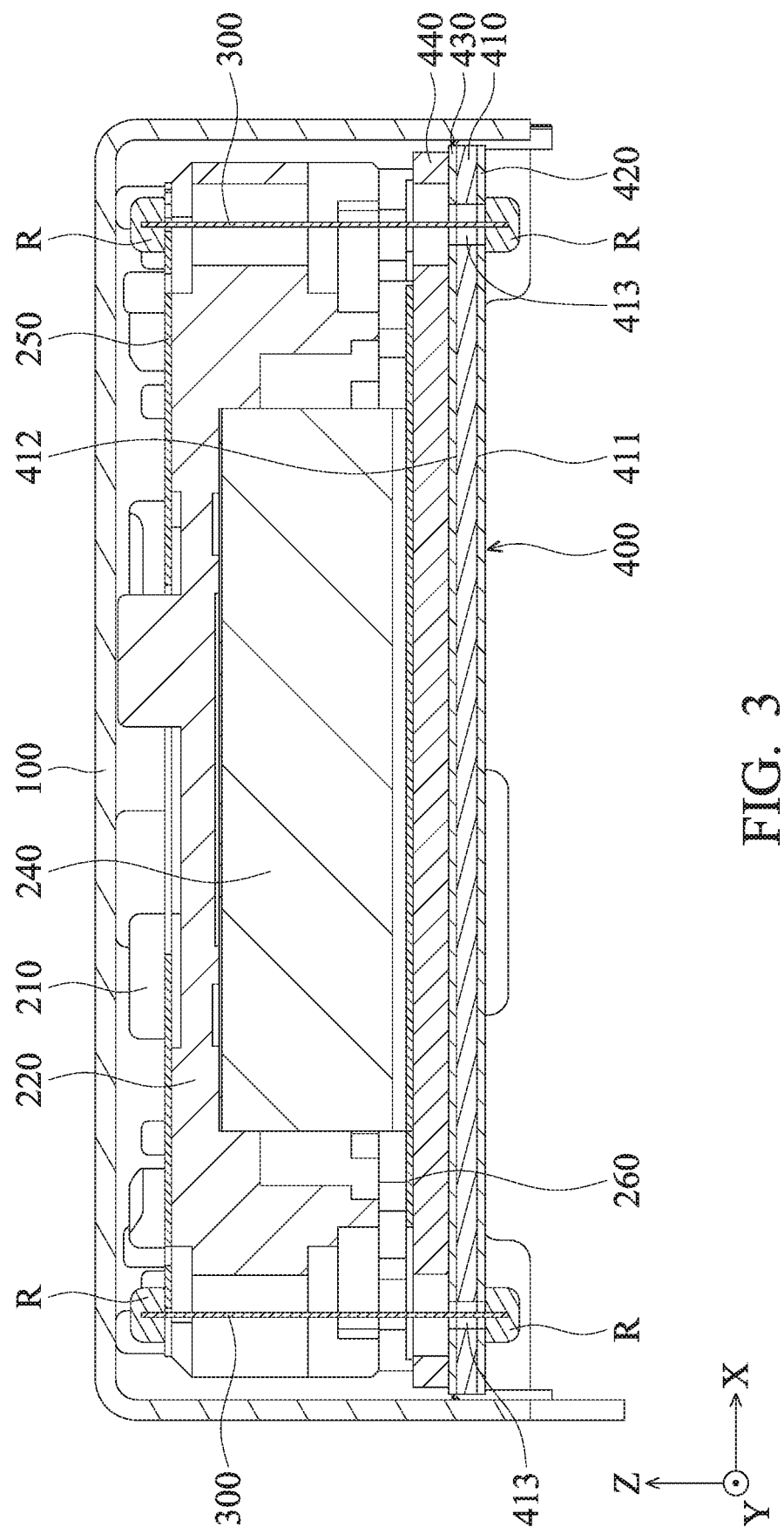
FIG. 3 is a cross-sectional view diagram of an optical member driving module according to an embodiment of the invention.

Referring to FIG. 3, in this embodiment, the base 400 comprises a main body 410, a first wire 420, a second wire 430, and a coil assembly 440. The main body has a first surface 411, a second surface 412, and a plurality of openings 413. The first surface 411 is opposite to the second surface 412, and the second surface 412 faces the optical member holder 210.

The first wire 420 and the second wire 430 are respectively formed on the first surface 411 and the second surface 412, and respectively electrically connected to the image sensor module S and the coil assembly 440. Similarly, when a current flows through the coil assembly 440 via the second wire 430, electromagnetic effect is generated between the coil assembly 440 and the second electromagnetic driving assembly 240 (or the first electromagnetic driving assembly 230), and the optical member holder 210 and the frame 220 can move along the X-axis and/or the Y-axis relative to the base 400. The optical member 30 can be driven to move along the X-axis and/or the Y-axis relative to the image sensor module S, and the purpose of image stabilization can be achieved.

The first electromagnetic driving assembly 230, the second electromagnetic driving assembly 240, and the coil assembly 440 can form an electromagnetic driving mechanism, which is used to drive the movable mechanism 200 to move relative to the base 400.

In some embodiment, the main body 410 comprises an insulation plate. The first wire 420 and the second wire 430 are directly formed on the insulation plate by coating or using a molded interconnect device (MID). For example, the molded interconnect device can be laser direct structuring (LDS), microscopic integrated processing technology (MIPTEC), laser induced metallization (LIM), laser restructuring print (LRP), an aerosol jet process, or a two-shot molding method. In some embodiments, the main body 410 comprises a metal plate and insulation layers disposed on the opposite surfaces of the metal plate. The first wire 420 and the second wire 430 can also be formed on the insulation layers directly by coating or using a molded interconnect device.

Referring to FIG. 3, the openings 413 are extended from the first surface 411 to the second surface 412, and the number and the position of the openings 413 correspond that of the suspension wires 300. The suspension wires 300 can pass through the openings 413 and be electrically connected to the first wire 420. The opposite ends of each of suspension wires 300 are respectively affixed to the first elastic member 250 and the first surface 411 of the main body 410 by the solders R. Since the length of the suspension wire 300 exceeds or the same as the distance between the first elastic member 250 and the base 400 plus the thickness of the base 400, the suspension wire 300 can comprise a longer length in a limited space, compared to the suspension wire in the conventional lens driving module. The reduction of the optical member driving module 10 can be facilitated.

When the optical member holder 210 and the optical member 30 moves along the X-axis and/or the Y-axis, the range of the motion thereof can be restricted by the suspension wires 300. It should be noted that, as shown in FIG. 3, a gap is formed between the suspension wires 300 and the inner wall of the openings 413. Therefore, the bending of the suspension wires 300 due to the contact between the suspension wires 300 and the inner wall of the openings 413 during the movement of the optical member holder 210 can be avoided. Moreover, since the suspension wires 300 comprise metal (for example, copper or an alloy thereof), the suspension wires 300 can be used as a conductor, for example, the current can flow into the first electromagnetic driving assembly 230 through the base 400 and the suspension wires 300.

As shown in FIG. 2, in this embodiment, the optical member driving module 10 further comprises a plurality of position detectors 500 disposed on the base 400. The position detectors 500 can detect the movement of the second electromagnetic driving assembly 240 to confirm the position of the optical member holder 210 and the optical member 30 in the X-axis and the Y-axis. For example, the position detector 290 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Figure 4A:
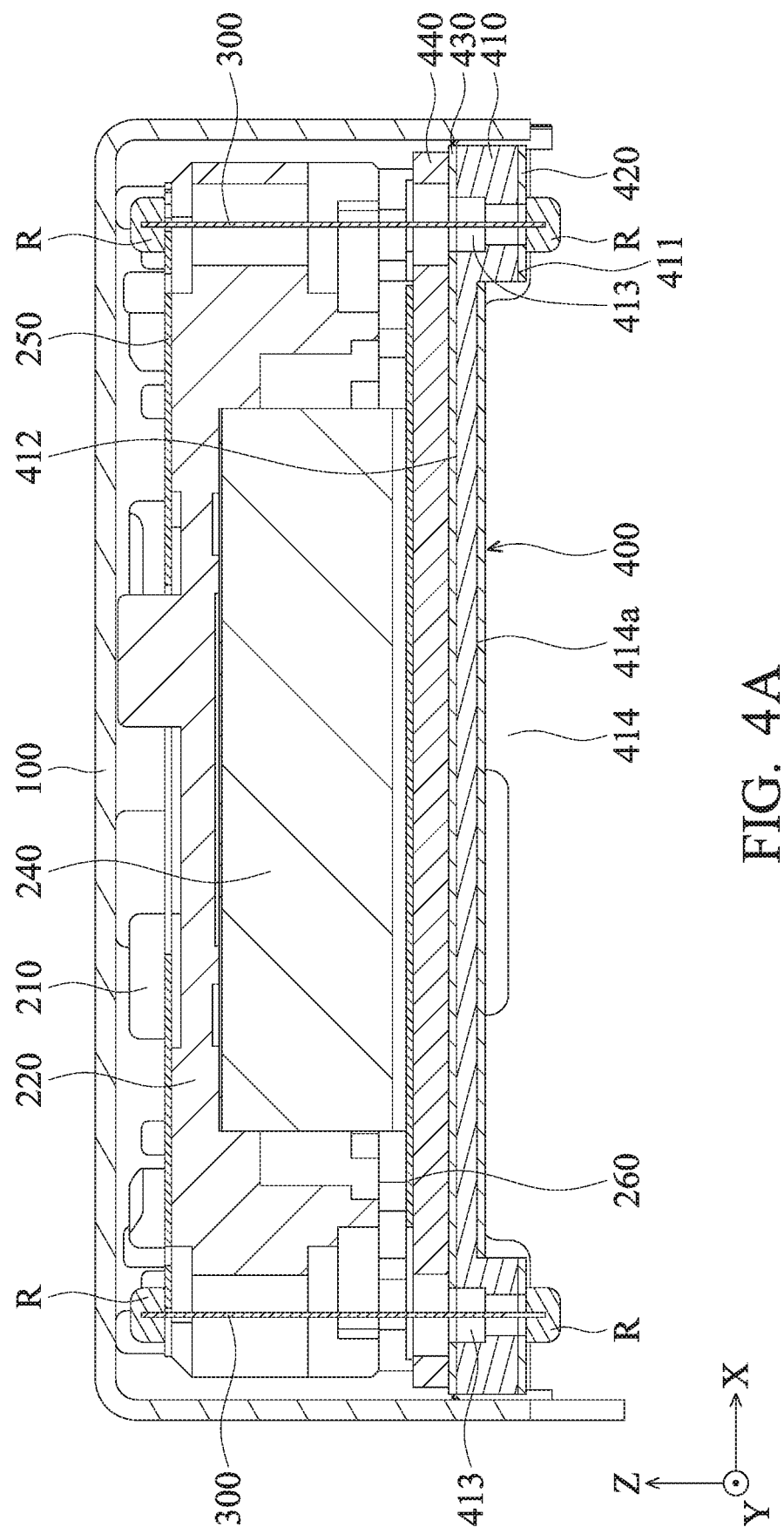
FIG. 4A is a schematic diagram of an optical member driving module according to another embodiment of the invention.

Referring to FIG. 4A, in another embodiment, the main body 410 of the base 400 further comprises a depression portion 414, wherein the distance between the bottom surface 414a of the depression portion 414 and the second surface 412 is less than that the distance between the first surface 411 and the second surface 412. It should be noted that, the distance between the bottom surface 414a and the second surface 412 in this embodiment is substantially the same as the distance between the first surface 411 and the second surface 412 in the embodiment shown in FIGS. 1-3. Thus, the length of the suspension wire 300 in this embodiment can be increased.

Figure 4B:
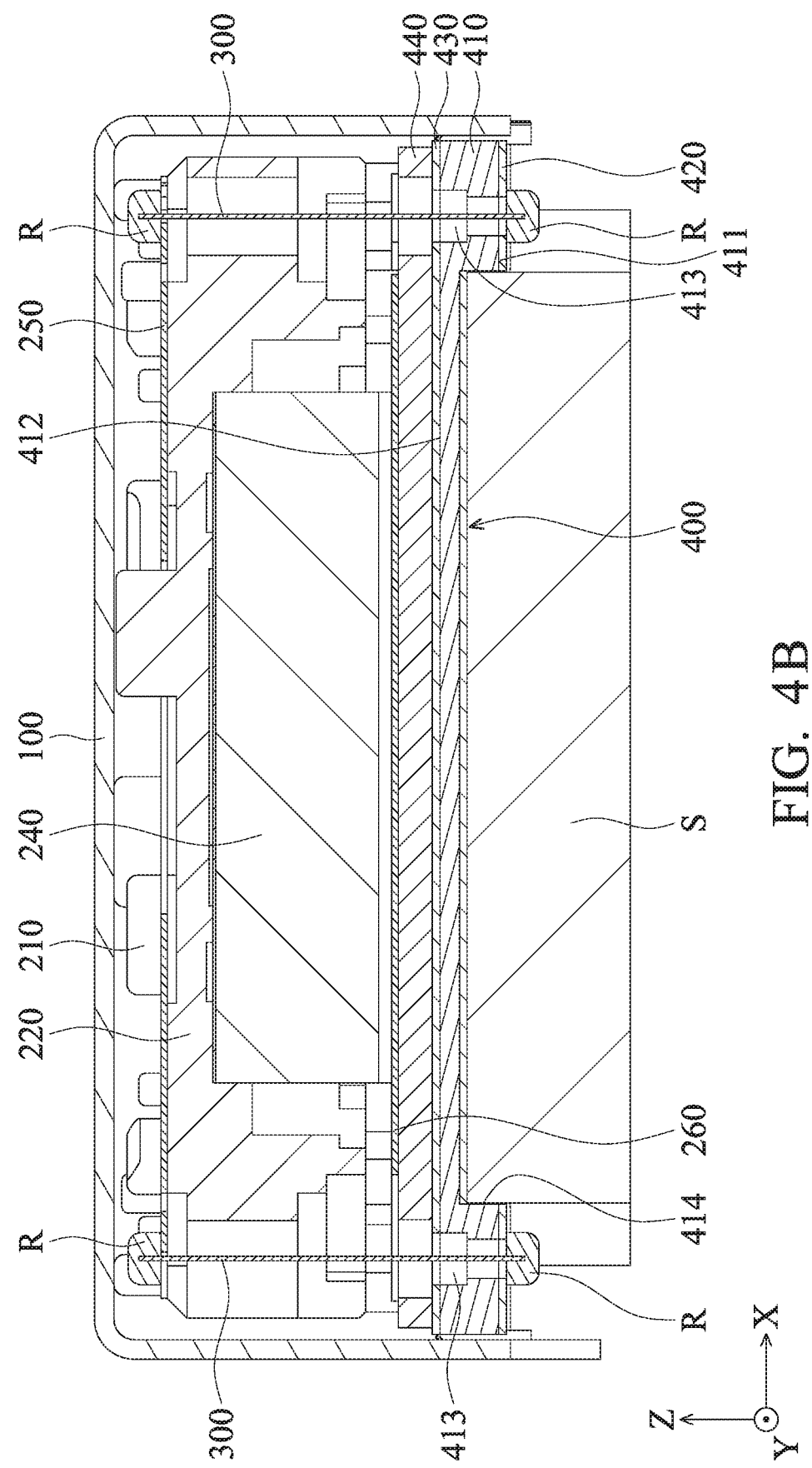
FIG. 4B is a schematic diagram of the optical member driving module shown in FIG. 4A joined to an image sensor module according to an embodiment of the invention.

As shown in FIG. 4B, when the optical member driving module 10 is connected to the image sensor module S, at least a portion of the image sensor module S can be accommodated in the depression portion 414. Thus, the whole thickness of the optical member driving module 10 and the image sensor module S is maintained, the miniaturization of the electronic device 20 can be facilitated.

Figure 5:
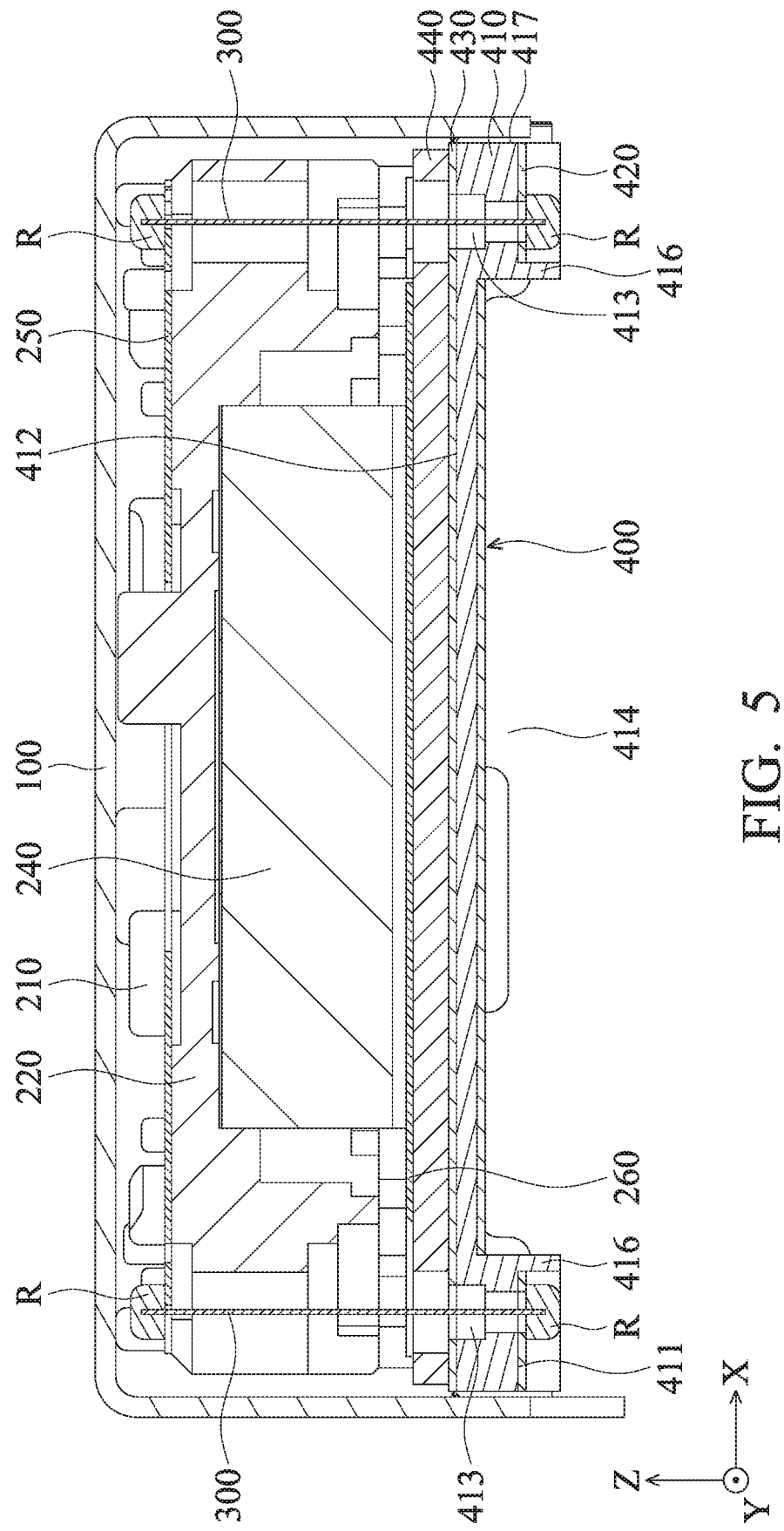
FIG. 5 is a schematic diagram of an optical member driving module according to another embodiment of the invention.

Referring to FIG. 5, in another embodiment, the main body 410 of the base 400 further comprises a lateral surface 417 and at least one protrusion 416. The lateral surface 417 is connected to the first surface 411 and to the second surface 412. The protrusion 416 is adjacent to the suspension wire 300 and protrudes from the first surface 411. The end of the suspension wire 300 affixed to the first surface 411 is disposed between the lateral surface 417 and the protrusion 416. Therefore, the protrusion 416 can prevent the solder R from flowing to the center of the base 400 (or the depression portion 414), wherein the aforementioned solder R is used to affix the suspension wire 300. The short circuit owing to the contact between the image sensor module S and the solder R when the optical member driving module 10 is connected to the image sensor module S can be avoided.

Figure 6:
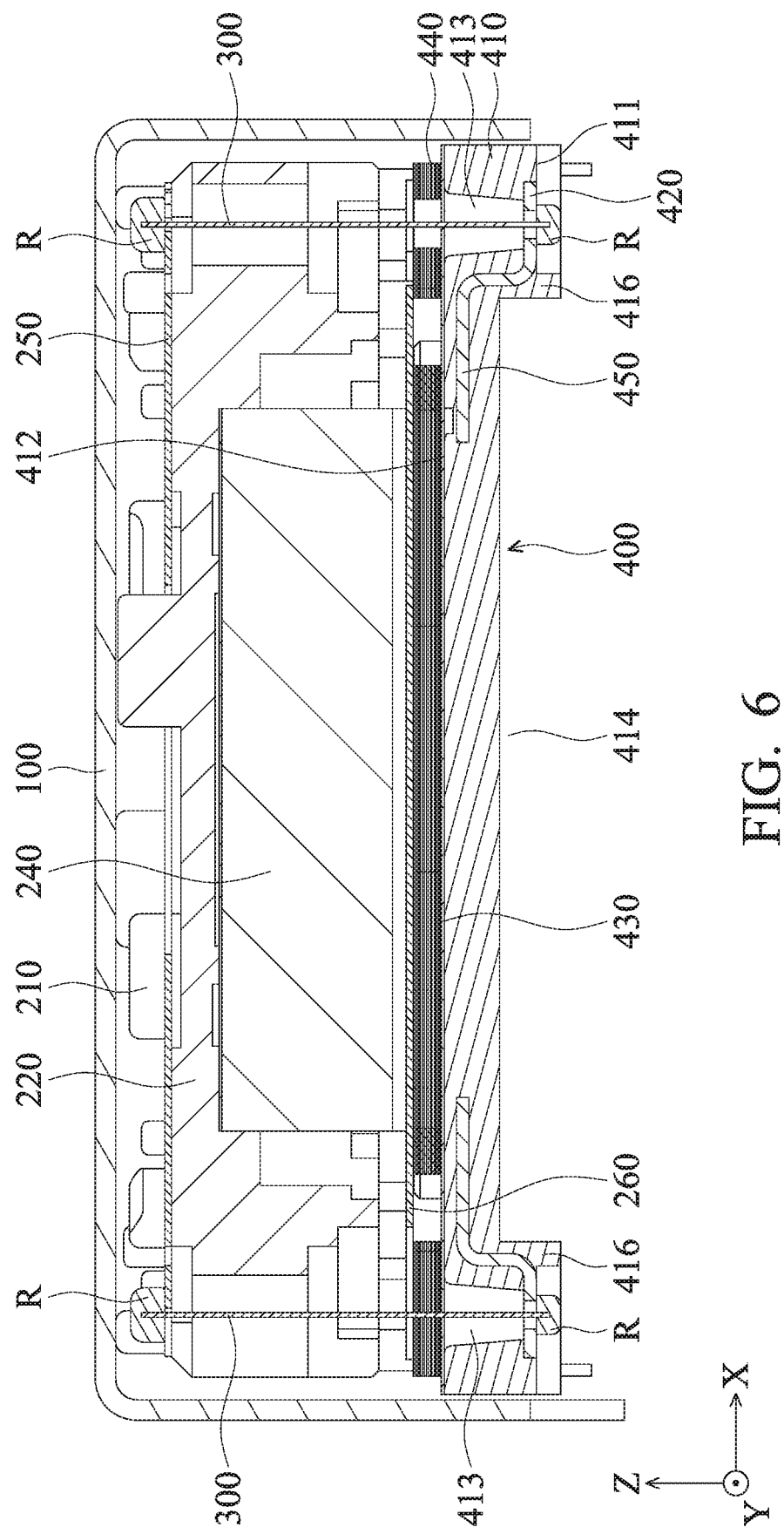
FIG. 6 is a schematic diagram of an optical member driving module according to another embodiment of the invention.

Referring to FIG. 6, in another embodiment, the base 400 further comprises an inner wire 450 embedded in the main body 410. The first wire 420 and the inner wire 450 are formed on the main body by insert molding. The inner wire 450 is electrically connected to the second wire 430.

Figure 7A:
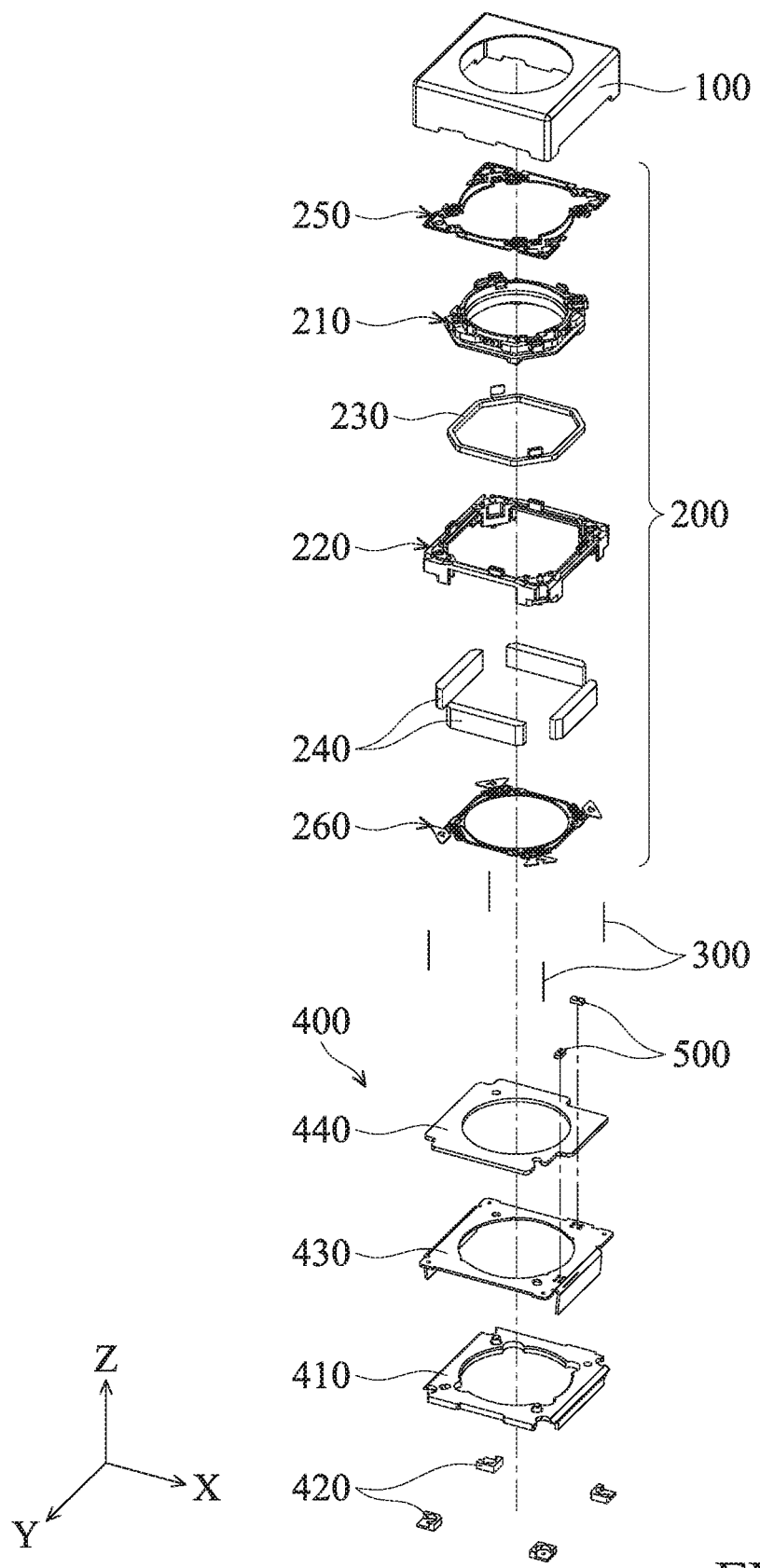
FIGS. 7A and 7B are schematic diagrams of an optical member driving module according to another embodiment of the invention.
Figure 7B:
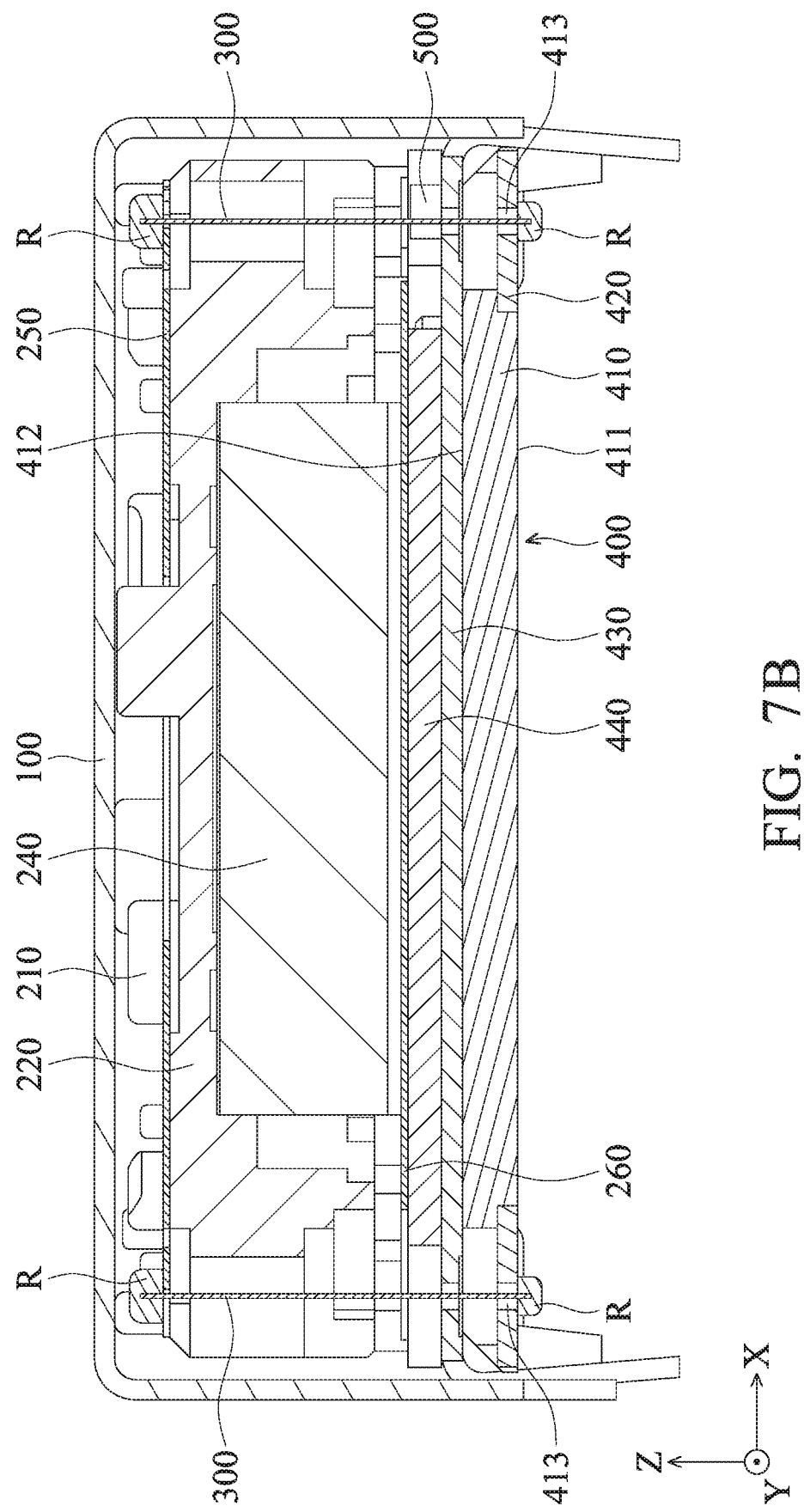
Figure 7C:
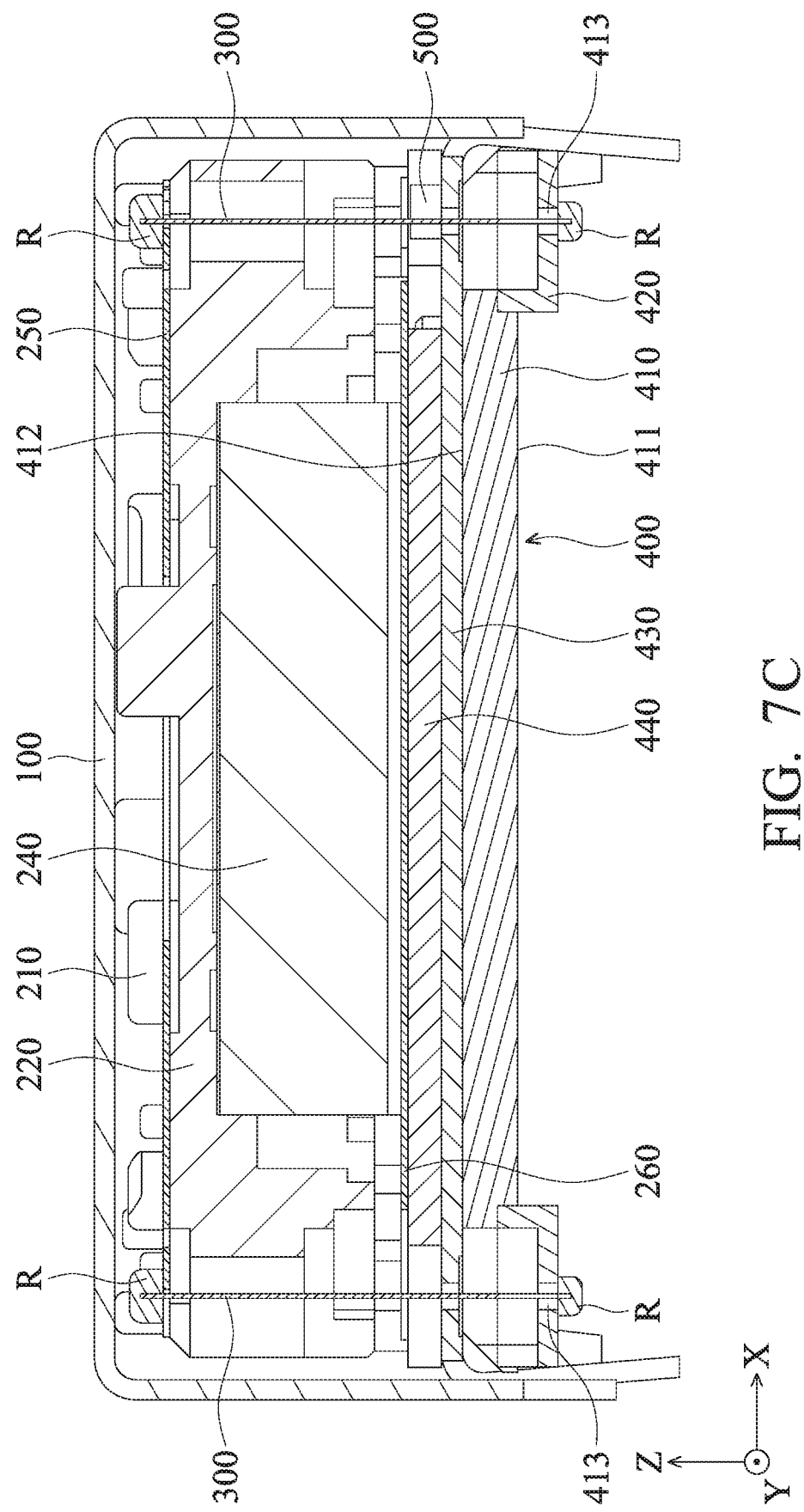
FIG. 7C is a schematic diagram of an optical member driving module according to another embodiment of the invention.

As shown in FIGS. 7A-7C, in some embodiments, the first wire 420 can be formed by at least one metal sheet connected to the main body 410, and the second wire 430 can be a flexible printed circuit (FPC) connected to the main body 410. In some embodiments, the first wire 420 and the second wire 430 can be formed by disposing flexible printed circuits on the opposite surfaces of the main body 410. In some embodiments, the main body 410 comprises a metal layer and insulation layers, wherein the insulation layers are disposed on the metal layer. The first wire 420 and the second wire 430 can be disposed on the insulation layers of the main body 410.

Figure 8A:
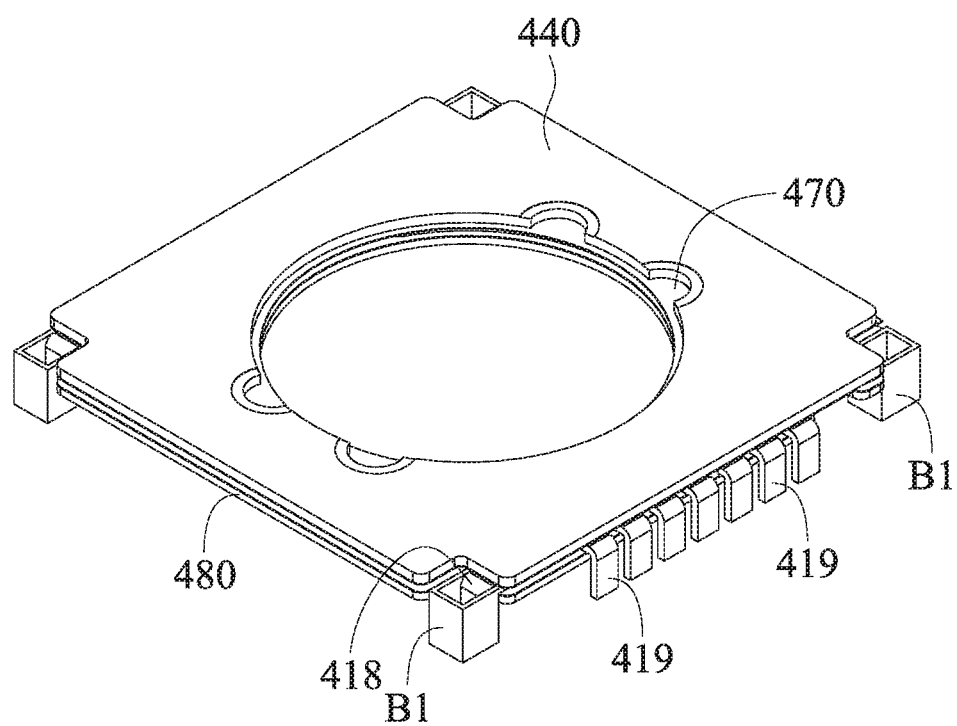
FIG. 8A is a schematic diagram of a base according to another embodiment of the invention.
Figure 8B:
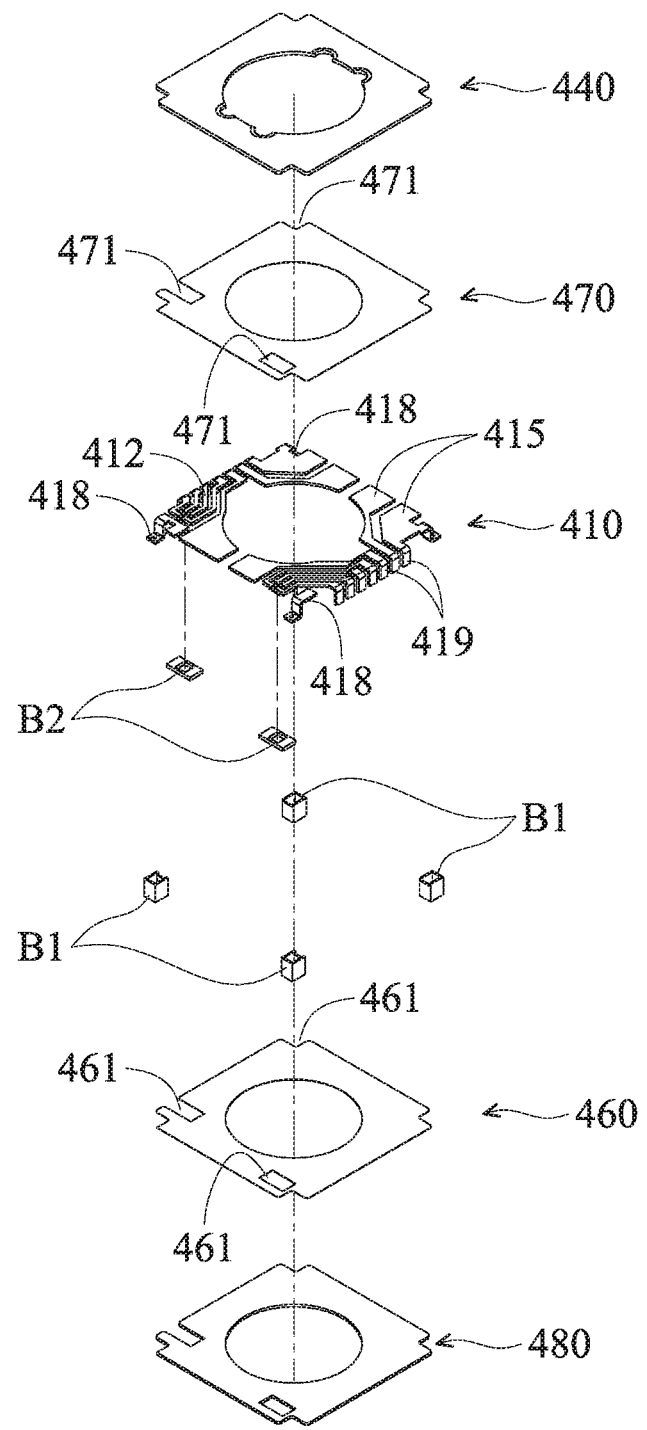
FIG. 8B is a schematic diagram of a base according to another embodiment of the invention.

Referring to FIGS. 8A and 8B, in order to reduce the thickness of the optical driving module 10, the base 400 in another embodiment comprises a main body 410, a coil assembly 440, a first insulation layer 460, a second insulation layer 470, a metal substrate 480, at least one first blocking member B1, and at least one second blocking member B2.

Figure 8C:
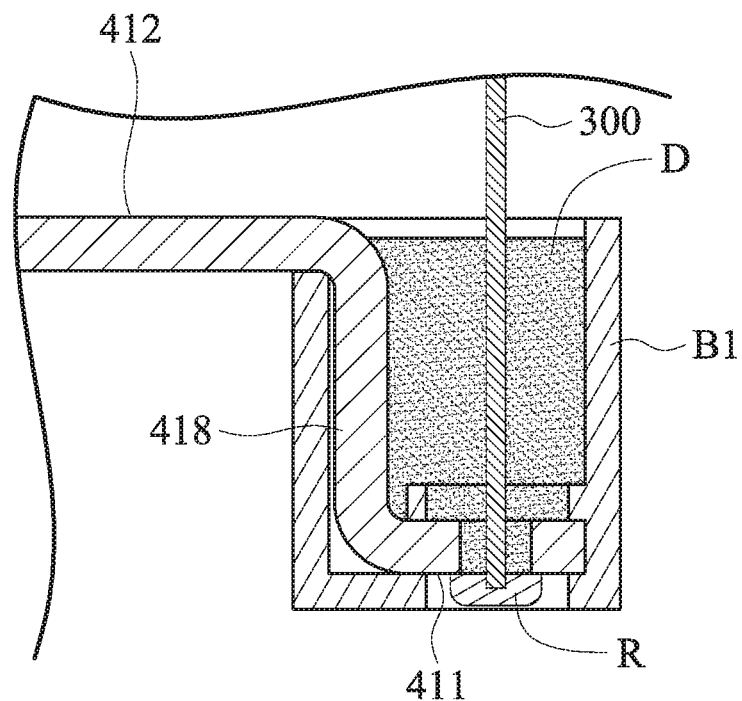
FIG. 8C is a schematic diagram of a first blocking member surrounding a suspension wire according to another embodiment of the invention.

The main body 410 comprises a plurality of metal frames 415 separated from each other, and has a plurality of extending portions 418 and a plurality of pins 419. The extending portions 418 are situated at four corners of the main body 410, extended toward the direction away from the movable mechanism 200, and comprise an L-shaped cross-section. As shown in FIG. 8C, the bottom surface of the extending portion 418 is the first surface 411, and the surface of the metal frames 415 facing the movable mechanism 200 is the second surface 412. The extending portion 418 is surrounded by the first blocking member B1. The end of the suspension wire 300 can pass through the extending portion 418 and be affixed to the first surface 411 by the solder R.

The stiffness of the extending portion 418 can be enhanced by the first blocking member B1, so as to prevent the bending of the extending portion 418 due to the pull of the suspension wire 418 during the movement of the frame 220 relative to the base 400. Furthermore, the short circuit between the metal frames 415 due to the overflowing of the solder R can also be prevented. In this embodiment, the first blocking member B1 has a hollow structure, and a damping member D is disposed in the hollow structure and covers a portion of suspension wire 300. Thus, the vibration of the suspension wire 300 during the movement of the frame 220 relative to the base 400 can be reduced.

Referring to FIGS. 8A and 8B, the pins 419 are extended toward the direction away from the movable mechanism 200, such that the pins 419 can be adjacent to and electrically connected to the image sensor module S. The metal frames 415 are formed on the first insulation layer 460. The projection area of the metal frames 415 on the first insulation layer 460 exceeds 50% of the area of the first insulation layer 460. Therefore, the mechanical strength of the base 400 can be enhanced. Furthermore, a plurality of openings 461 are formed on the first insulation layer 460. The suspension wires 300 and the position detectors 500 can be connected to the metal frame 415 via the openings 461.

Figure 8D:
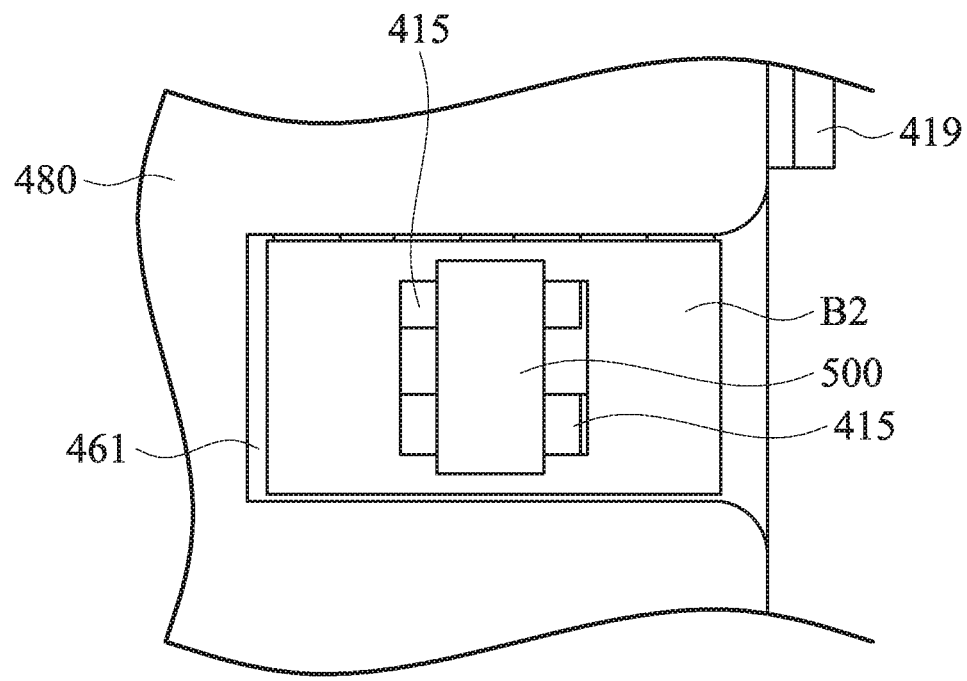
FIG. 8D is a schematic diagram of a second blocking member surrounding a connecting portion between a position detector and a base according to another embodiment of the invention.

As shown in FIG. 8D, when the position detectors 500 are connected to the metal frames 415, the second blocking member B2 surrounds the connecting portion of the position detectors 500 and the metal frames 415. Similarly, a short circuit between the metal frames 415 due to the overflowing of the solder can be prevented, wherein the aforementioned solder is used to affix the position detector 500 to the metal frames 415.

The second insulation layer 470 is disposed between the coil assembly 440 and the main body 410. Similar to the first insulation layer 460, a plurality of openings 471 are formed on the second insulation layer 470. The suspension wires 300 and the coil assembly 440 can be connected to the metal frame 415 via the openings 471.

The metal substrate 480 is connected to the first insulation layer 460, and the first insulation layer 460 is disposed between the main body 410 and the metal substrate 480. The flatness of the main body 410 can be increased by the metal substrate 480, and the metal substrate 480 can be soldered to the housing 100 to join the base 400 and the housing 100.

It should be noted that, the thickness of the first insulation layer 460 is less than half of the thickness of the main body 410, and the thickness of the second insulation layer 470 is less than half of the thickness of the main body 410. Therefore, compared to the base which arranged wires on the opposite surfaces of the insulation plate, the thickness of the base 400 in this embodiment is reduced. In some embodiments, the thickness of the first insulation layer 460 and the thickness of the second insulation layer 470 are less than the ¼ of the thickness of the main body 410. For example, the thickness of the main body 410 is 0.15 mm-0.20 mm, and the thickness of the first insulation layer 460 and the thickness of the second insulation layer 470 are 0.01 mm-0.03 mm.

In some embodiments, the second insulation layer 470 and/or the metal substrate 480 can be omitted as required, so as to reduce the thickness of the base 400. In some embodiments, the insulation material can be filled between the metal frames 415 of the main body 415, and the coil assembly 440 and the second insulation layer 470 can be horizontally disposed on the main body 410, wherein the insulation material is different from the material of the first and second insulation layers 460 and 470.

Figure 9A:
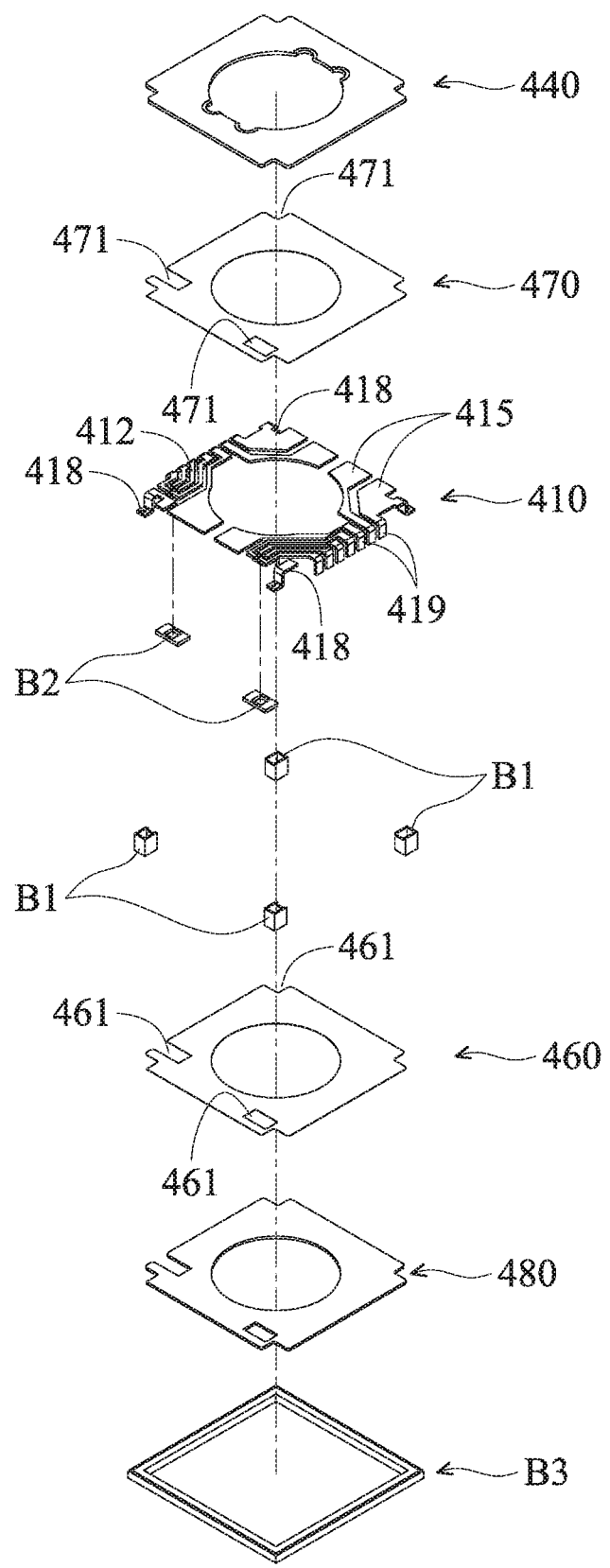
FIG. 9A is a schematic diagram of a base according to another embodiment of the invention.
Figure 9B:
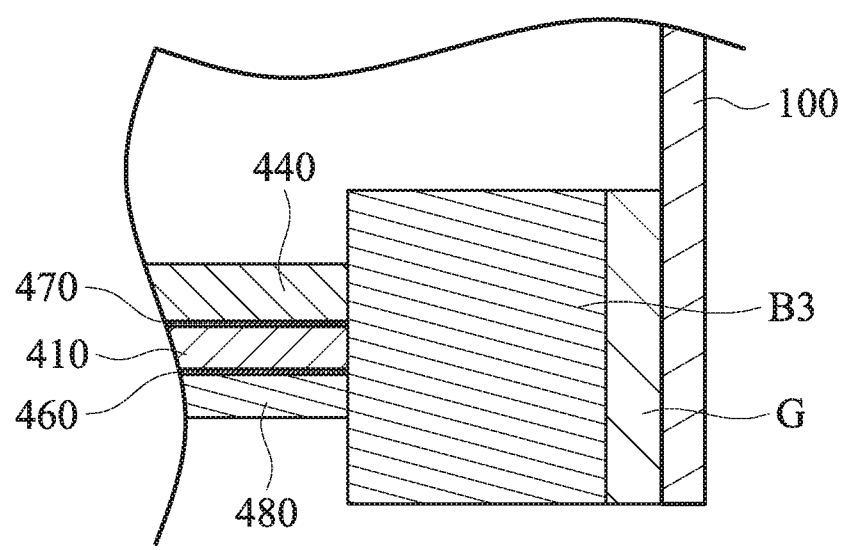
FIG. 9B is a schematic diagram of a third blocking member connected to a housing according to another embodiment of the invention.

Referring to FIGS. 9A and 9B, in another embodiment, the base 400 can further comprise a third blocking member B3 surrounding the main body 410 of the base 400. When the base 400 is joined to the housing 100, the solder or the glue G can be disposed between the third blocking member B3 and the housing 100. Therefore, the contacting area of the solder or the glue G can be increased, and can prevent external objects from entering.

Figure 10:
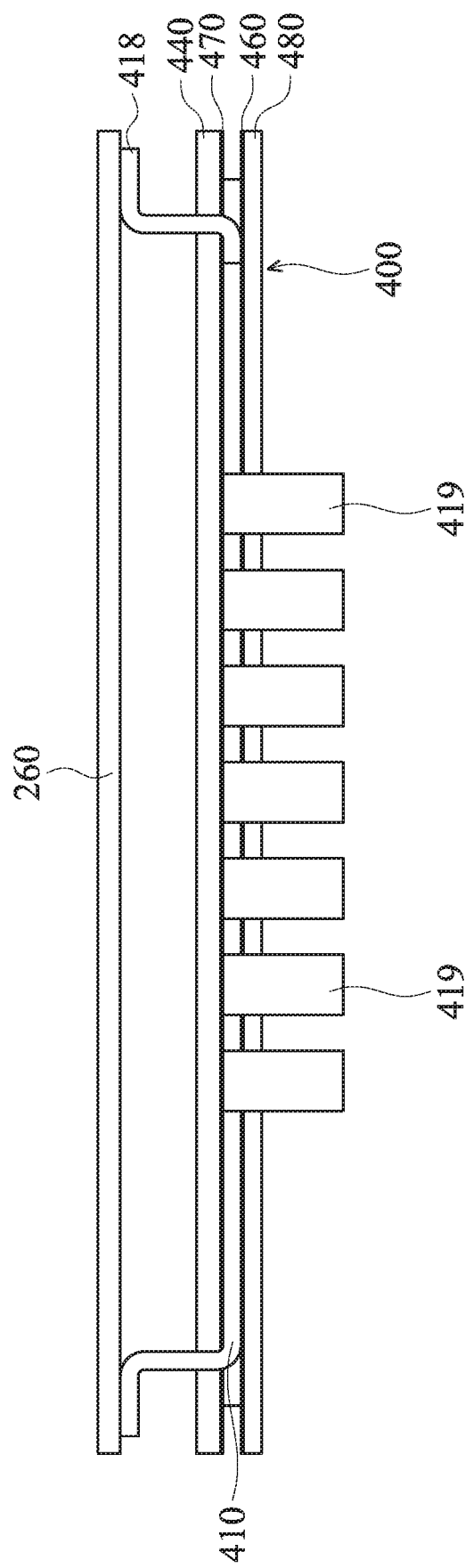
FIG. 10 is a schematic diagram of a base connected to a second elastic member according to another embodiment of the invention.

As shown in FIG. 10, in another embodiment, the extending portion 418 of the main body 410 can be extended toward the movable mechanism 200 and hold the members of the movable mechanism 200, such as the second elastic member 260.

In summary, an optical member driving module is provided. Since the suspension wire of the optical member driving module extends through the base, the suspension wire can comprise appropriate tension when the thickness of the optical member driving module is small. Furthermore, since the base of the optical member driving module comprises a plurality of metal frames, the thickness of the base can be reduced, and the thickness of the optical member driving module can be reduced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving module, comprising:
a movable mechanism, comprising an optical member holder;
a base, comprising a main body, wherein the main body comprises a first surface, a second surface, and an opening, the second surface faces the optical member holder and is opposite to the first surface, and the opening extends from the first surface to the second surface;
a suspension wire, extended through the opening, wherein an opposite end of the suspension wire are respectively affixed to the first surface and the movable mechanism; and
an electromagnetic driving mechanism, which is used to drive the movable mechanism to move relative to the base, wherein the base has a depression portion, and a distance between a bottom surface of the depression portion and the second surface is less than a distance between the first surface and the second surface.

2. The optical member driving module as claimed in claim 1, wherein a gap is formed between the suspension wire and an inner wall of the opening.

3. The optical member driving module as claimed in claim 1, wherein the optical member driving module is disposed on an image sensor module, and at least a portion of the image sensor module is accommodated in the depression portion.

4. An optical member driving module, comprising:
a movable mechanism, comprising an optical member holder;
a base, comprising a main body, wherein the main body comprises a first surface, a second surface, and an opening, the second surface faces the optical member holder and is opposite to the first surface, and the opening extends from the first surface to the second surface;
a suspension wire, extended through the opening, wherein an opposite end of the suspension wire are respectively affixed to the first surface and the movable mechanism; and
an electromagnetic driving mechanism, which is used to drive the movable mechanism to move relative to the base, wherein the base has a protrusion protruding from the first surface.

5. The optical member driving module as claimed in claim 4, wherein the protrusion is adjacent to the suspension wire.

6. The optical member driving module as claimed in claim 4, wherein the base has a lateral surface connected to the first surface and the second surface, and an end of the suspension wire is disposed between the lateral surface and the protrusion.

7. An optical member driving module, comprising:
a movable mechanism, comprising an optical member holder;
a base, comprising a main body, wherein the main body comprises a first surface, a second surface, and an opening, the second surface faces the optical member holder and is opposite to the first surface, and the opening extends from the first surface to the second surface;
a suspension wire, extended through the opening, wherein an opposite end of the suspension wire are respectively affixed to the first surface and the movable mechanism; and
an electromagnetic driving mechanism, which is used to drive the movable mechanism to move relative to the base, wherein the base further comprises a first wire, disposed on a first surface.

8. The optical member driving module as claimed in claim 7, wherein the base further comprises an inner wire embedded in the main body and electrically connected to the first wire.

9. The optical member driving module as claimed in claim 8, wherein the first wire and the inner wire are formed on the main body by insert molding.

10. The optical member driving module as claimed in claim 7, wherein the first wire is formed on the main body by coating or using a molded interconnect device.

11. The optical member driving module as claimed in claim 7, wherein the first wire is formed by a metal sheet connected to the main body.

12. An optical member driving module, comprising:
a movable mechanism, comprising an optical member holder;
a base, comprising a main body, wherein the main body comprises a first surface, a second surface, and an opening, the second surface faces the optical member holder and is opposite to the first surface, and the opening extends from the first surface to the second surface;

a suspension wire, extended through the opening, wherein an opposite end of the suspension wire are respectively affixed to the first surface and the movable mechanism; and an electromagnetic driving mechanism, which is used to drive the movable mechanism to move relative to the base, wherein the optical member driving module further comprises a second wire disposed on the second surface and electrically connected to the electromagnetic driving mechanism.

* * * * *